(12) United States Patent
Elmaleh

(10) Patent No.: US 7,902,708 B2
(45) Date of Patent: Mar. 8, 2011

(54) ELECTRO-MAGNETIC MOTOR GENERATOR SYSTEM

(76) Inventor: Shimon Elmaleh, Pinecrest, FL (US)

( * ) Notice: Subject to any disclaimer, the term of this patent is extended or adjusted under 35 U.S.C. 154(b) by 261 days.

(21) Appl. No.: 12/349,777

(22) Filed: Jan. 7, 2009

(65) Prior Publication Data

US 2010/0171384 A1 Jul. 8, 2010

(51) Int. Cl.
*H02K 21/12* (2006.01)

(52) U.S. Cl. ............... 310/156.43; 310/10; 310/12.15; 310/12.18; 310/12.24; 310/12.32; 310/83; 903/906

(58) Field of Classification Search ............ 310/10, 310/12.15, 12.18, 12.24, 12.32, 83, 156.43; 903/906; *H02K 21/12*
See application file for complete search history.

(56) References Cited

U.S. PATENT DOCUMENTS

| | | | | |
|---|---|---|---|---|
| 1,819,606 A | * | 8/1931 | Jones | 475/108 |
| RE29,411 E | * | 9/1977 | Newell | 310/49.47 |
| 4,274,023 A | * | 6/1981 | Lamprey | 310/83 |
| 4,501,980 A | * | 2/1985 | Welburn | 310/12.15 |
| 4,649,307 A | * | 3/1987 | Bech | 310/99 |
| 4,691,119 A | * | 9/1987 | McCabria | 307/84 |
| 5,650,681 A | * | 7/1997 | DeLerno | 310/164 |
| 6,731,033 B2 | * | 5/2004 | Sakamoto | 310/75 R |
| 2010/0171384 A1 | * | 7/2010 | Elmaleh | 310/156.43 |

* cited by examiner

*Primary Examiner* — Quyen Leung
*Assistant Examiner* — John K Kim
(74) *Attorney, Agent, or Firm* — Albert Bordas, P.A.

(57) ABSTRACT

An electro-magnetic motor-generator system, including a wheel assembly having a wheel mounted onto a shaft. The shaft has a sleeve mounted thereon. A frame assembly is mounted onto the sleeve. The frame assembly comprises at least one hub having a sprocket. A gear assembly comprises a second sprocket mounted onto the shaft that engages the sprocket. A rotating ring assembly has first and second walls. The first wall comprises first gear teeth and the second wall comprises second gear teeth. The ring assembly further has consecutive magnetized/non-magnetized sections. The electro-magnetic means consist of at least one coil having first and second openings. Electro-magnetic means generate an electromotive force between said first and second openings, and said consecutive magnetized/non-magnetized sections. Switching said magnetic polarity forces said rotating ring assembly to rotate upon said sprocket thus rotating said wheel mounted onto said shaft.

20 Claims, 4 Drawing Sheets

ELECTRO-MAGNETIC MOTOR GENERATOR SYSTEM

BACKGROUND OF THE INVENTION

1. Field of the Invention

The present invention relates to motor-generator systems, and more particularly, to electro-magnetic motor-generator systems.

2. Description of the Related Art

Engines and motors, especially internal-combustion engines are the primary type of engine to propel vehicles, and in particular automobiles, sport utility vehicles, and trucks. Known engines and motors provide for a number of more or less complicated features that fail to solve the problem in an efficient and economical way. Applicant is not aware or any electro-magnetic motor-generator systems having the novel features of the present invention.

SUMMARY OF THE INVENTION

The instant invention is an electro-magnetic motor-generator system, comprising a rotating wheel assembly having a wheel mounted onto a shaft. The shaft has a sleeve mounted thereon at a first predetermined distance from the wheel. A frame assembly is mounted onto the sleeve at a second predetermined distance from the wheel. The frame assembly comprises at least one hub. The at least one hub comprises a respective first sprocket rotatably mounted thereon. The shaft and the at least one hub are parallel to one another. A gear assembly comprises a second sprocket mounted onto the shaft at a third predetermined distance from the wheel. The second sprocket engages the first sprocket. A rotating ring assembly has first and second walls. The first wall comprises first gear teeth and the second wall comprises second gear teeth. The ring assembly further has consecutive magnetized/non-magnetized sections. The first gear teeth engage the first sprocket. The rotating ring assembly travels through the at least one coil.

Electro-magnetic means consists of at least one coil arranged stationary. The at least one coil has first and second openings. The at least one coil comprises at least two third sprockets that engage the first and second gear teeth as the rotating ring assembly travels through the at least one coil. The at least two third sprockets are secured within the at least one coil with an internal frame assembly. The first and second openings include winding terminals electrically connected to a distributor. The distributor has synchronizing means to send an electrical current to the at least one coil to switch magnetic polarity. The electro-magnetic means generate an electromotive force between the first and second openings, and the consecutive magnetized/non-magnetized sections when synchronized by the distributor, wherein switching the magnetic polarity between the first and second openings forces the rotating ring assembly to rotate upon the first sprocket. Thus, rotating the wheel mounted onto the shaft to propel a vehicle.

It is therefore one of the main objects of the present invention to provide an electro-magnetic motor-generator system to propel vehicles, including automobiles, sport utility vehicles, and trucks.

It is another object of this invention to provide an electro-magnetic motor-generator system comprising a wheel assembly having a wheel mounted onto a shaft.

It is another object of this invention to provide an electro-magnetic motor-generator system comprising electro-magnetic means to generate an electromotive force between first and second openings, and consecutive magnetized/non-magnetized sections, whereby switching magnetic polarity forces a rotating ring assembly to rotate upon a sprocket, thus rotating a wheel mounted onto a shaft to propel the vehicle.

It is yet another object of this invention to provide such an electro-magnetic motor-generator system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
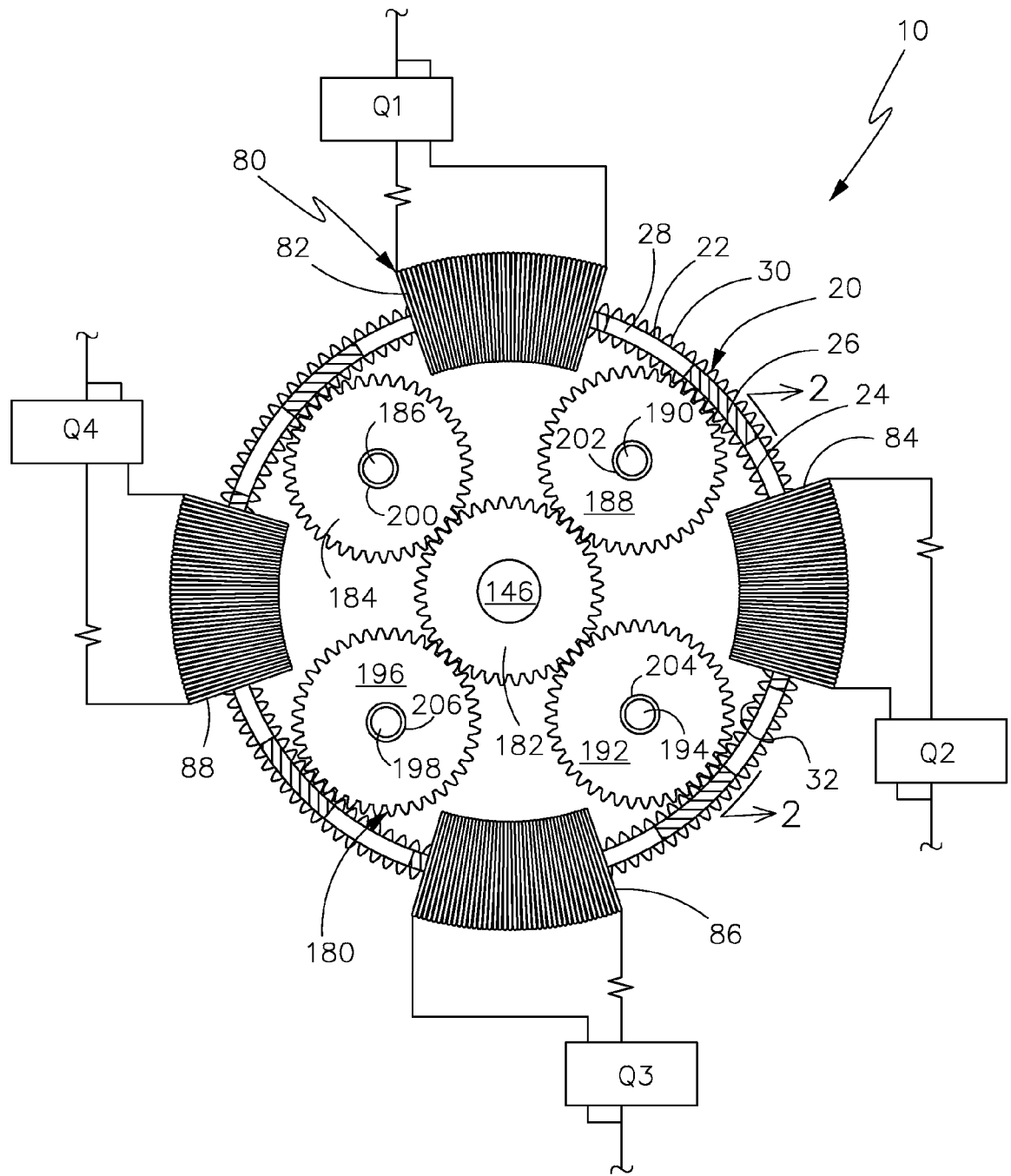
FIG. 1 is a front elevation sectional view of the instant invention.

Referring now to the drawings, the present invention is generally referred to with numeral 10. It can be observed that it basically includes ring assembly 20, electro-magnetic assembly 80, wheel assembly 140, frame assembly 150, and gear assembly 180.

As seen in FIG. 1, electro-magnetic motor-generator system 10 comprises rotating ring assembly 20 having exterior wall 22 and interior wall 24. Exterior wall 22 comprises external gear teeth 30 and interior wall 24 comprises internal gear teeth 32. Ring assembly 20 further has magnetic sections 26 and non-magnetic sections 28. In a preferred embodiment, magnetic sections 26 and non-magnetic sections 28 are consecutive, meaning that one magnetic section 26 abuts a non-magnetic section 28, which in turn abuts another magnetic section 26 to form a ring, as seen in the present illustration.

Gear assembly 180 comprises central sprocket 182 fixedly mounted onto shaft 146 of wheel assembly 140. As seen in this illustration, central sprocket 182 engages sprockets 184; 188; 192; and 196 that also engage external gear teeth 30.

Electro-magnetic assembly 80 comprises stationary coil assemblies 82; 84; 86; and 88. First and second openings of each coil assembly 82; 84; 86; and 88 include winding terminals electrically connected to a distributor, not seen. The distributor has synchronizing means to send an electrical current to coil assemblies 82; 84; 86; and 88 to switch magnetic polarity. The electro-magnetic means generates an electromotive force between the first and second openings, and magnetic sections 26 and non-magnetic sections 28 when synchronized by the distributor, wherein switching the magnetic polarity between the first and second openings forces rotating ring assembly 20 to rotate upon sprockets 184; 188; 192; and 196, thus exerting a rotational force on shaft 146, which is transferred to wheel assembly 140 to accelerate a vehicle. Conversely, the vehicle may be slowed by reversing the switching of the magnetic polarity between the first and second openings to slow the rotating ring assembly 20 upon sprockets 184; 188; 192; and 196, thus exerting a braking force on shaft 146, which is transferred to wheel assembly 140 to brake the vehicle.

Figure 2:
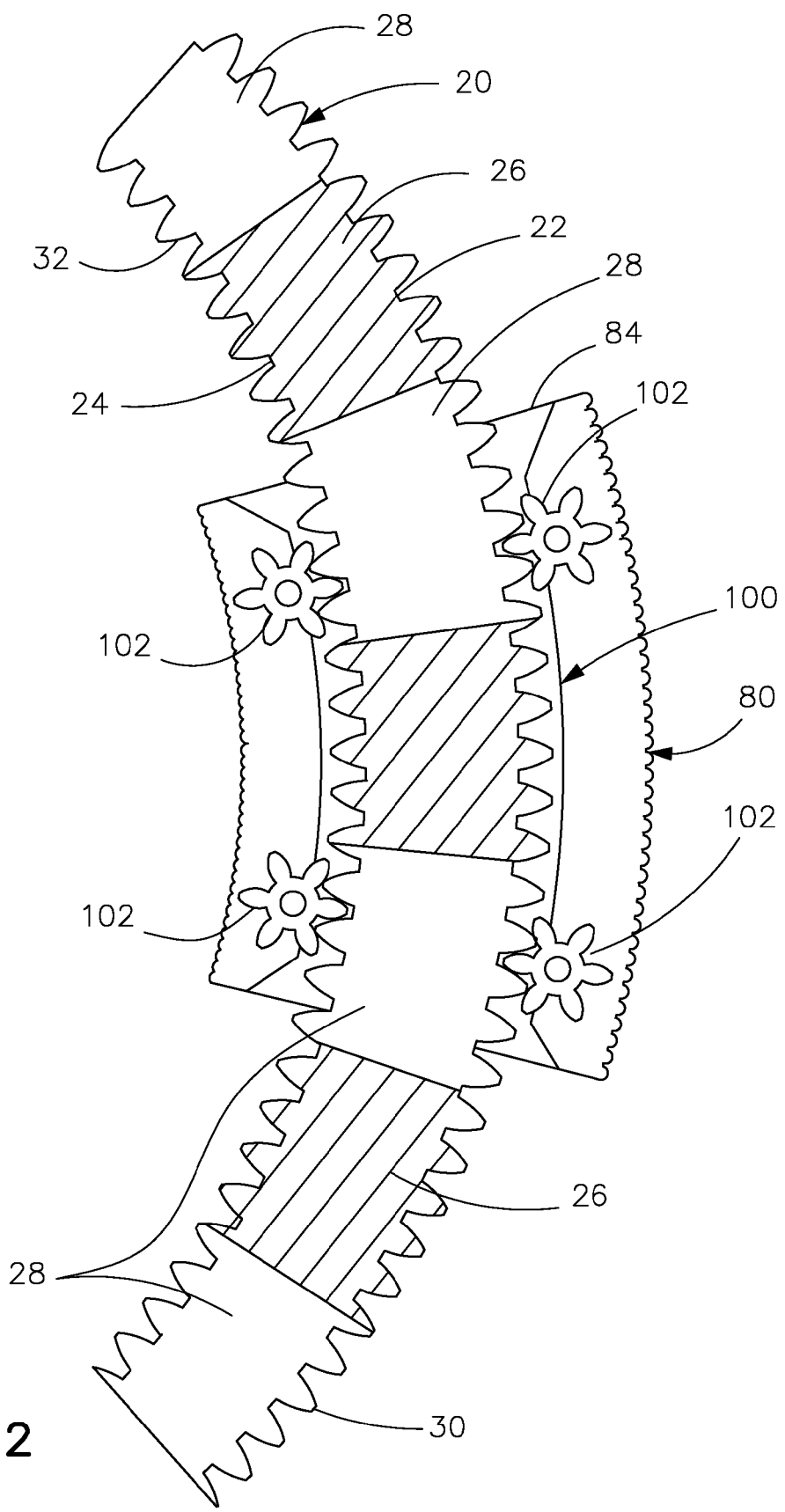
FIG. 2 is a cut view of an electro-magnetic coil taken along the lines 2-2 as seen in FIG. 1.

As best seen in FIG. 2, each of coil assemblies 82; 84; 86; and 88 comprise an internal frame assembly 100 having a plurality of sprockets 102 mounted thereon. Sprockets 102 engage external gear teeth 30 and internal gear teeth 32 as rotating ring assembly 20 travels through each of coil assemblies 82; 84; 86; and 88.

Figure 3:
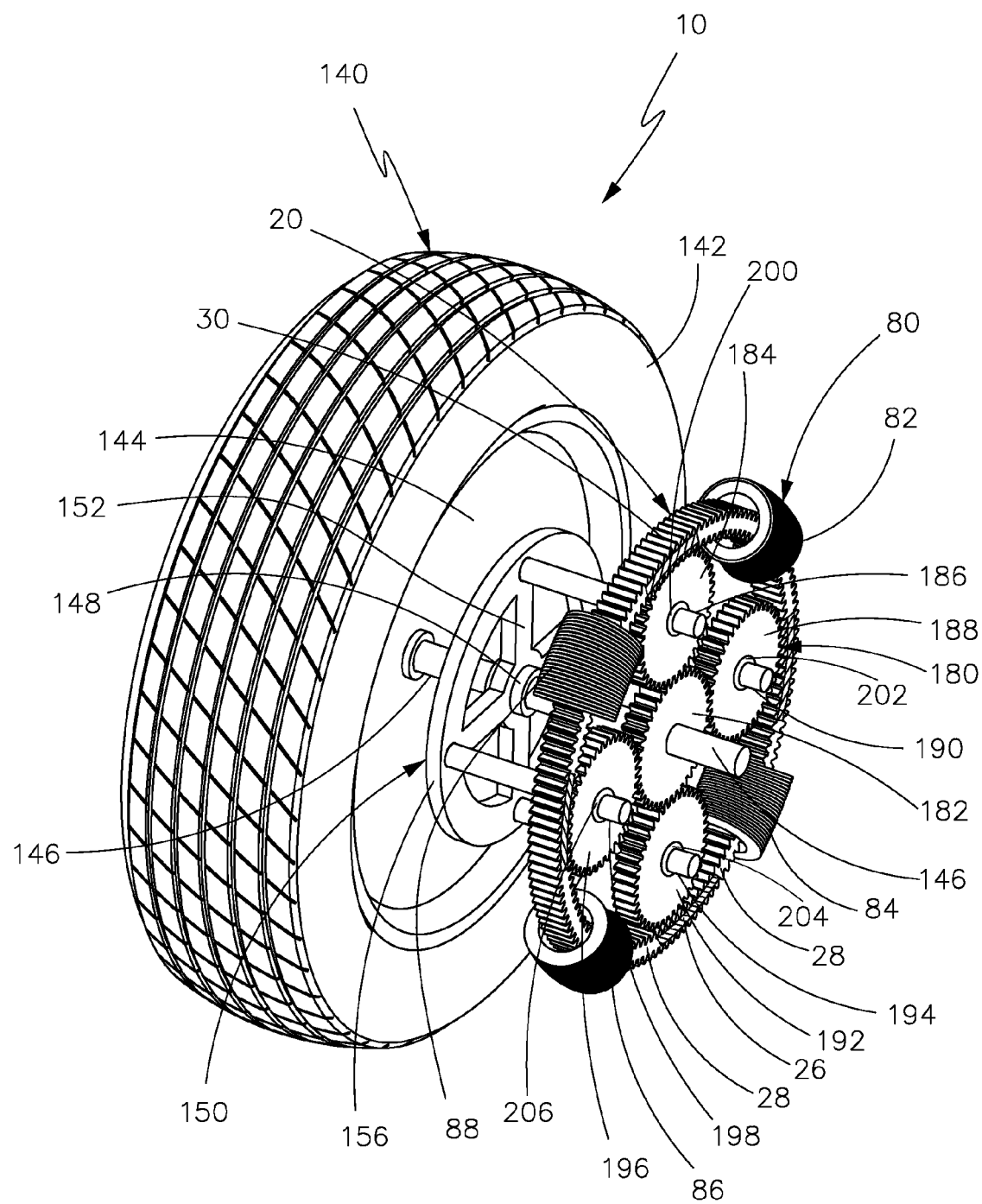
FIG. 3 is an isometric view of the instant invention mounted onto its wheel assembly.

As seen in FIG. 3, fixedly mounted onto an interior portion of a vehicle, not seen, is frame assembly 150. In the preferred embodiment, frame assembly 150 is circular in shape and is mounted onto sleeve 148 at a predetermined distance from wheel 144. Although not illustrated, it is noted that sleeve 148 comprises internal bearings to allow shaft 146 to easily rotate therein. More specifically, frame assembly 150 comprises support members 152 that extend inwardly from circular ring 156 onto sleeve 148. Support members 152 provide for added stability. Perpendicularly extending from circular ring 156 are hubs 186; 190; 194; and 198. Mounted at a predetermined distance from frame assembly 150 are bearings 200; 202; 204; and 206 that are mounted to hubs 186; 190; 194; and 198, respectively. Sprockets 184; 188; 192; and 196 are mounted onto bearings 200; 202; 204; and 206 respectively. Hubs 186; 190; 194; and 198 are parallel to shaft 146.

Figure 4:
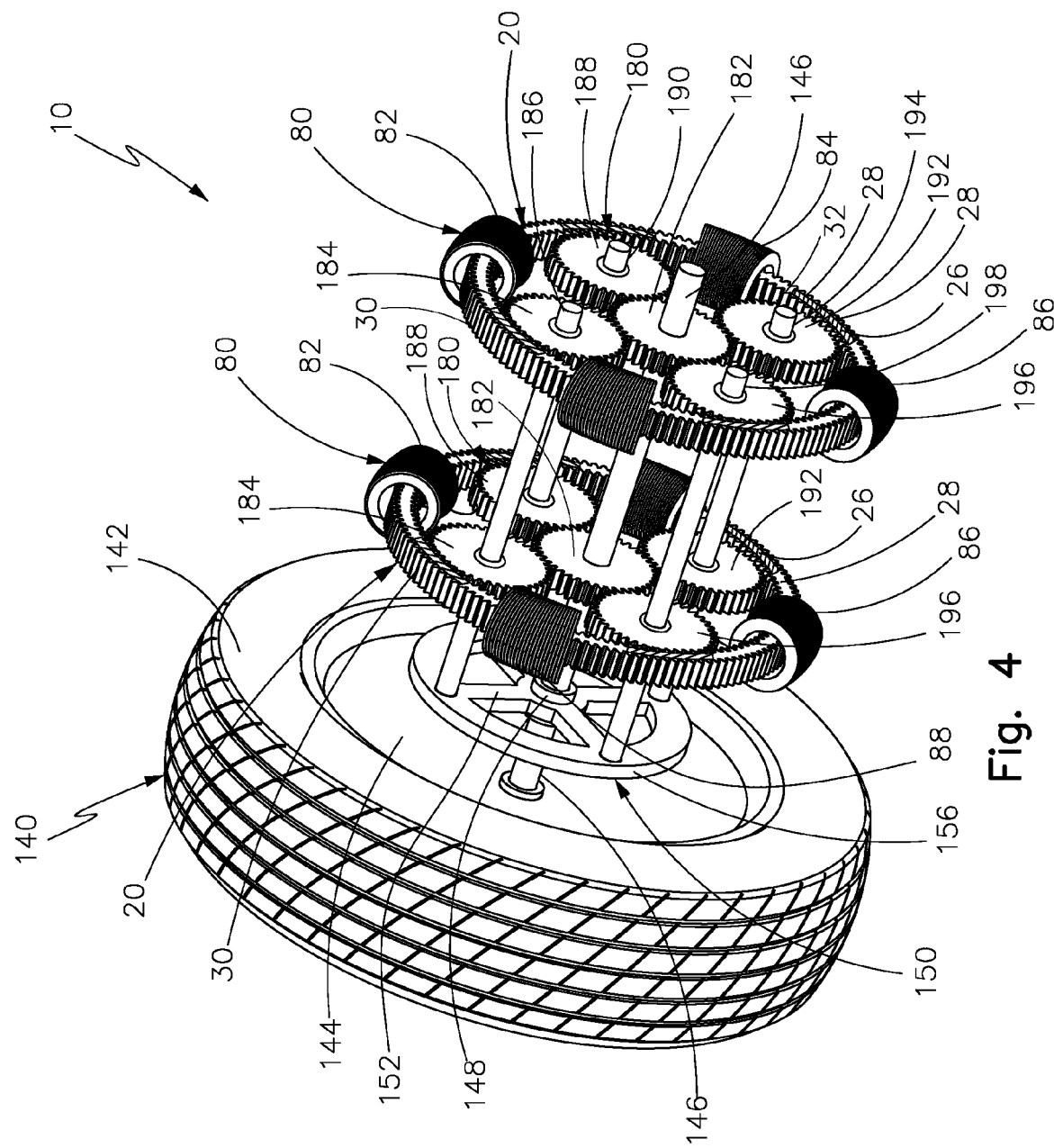
FIG. 4 is an isometric view of a plurality of instant inventions mounted onto the wheel assembly seen in FIG. 3.

As seen in FIGS. 3 and 4, wheel assembly 140, only one of which is shown for simplification, comprises tire 142 mounted onto wheel 144. In the preferred embodiment, shaft 146 is an axle, defined as a central shaft for rotating wheel 144. In the preferred embodiment, wheel 144 is fixed onto shaft 146. Shaft 146 is an integral structural component of the wheeled vehicle. Shaft 146 maintains the position of each wheel 144 relative to each other and to the vehicle body. Since for most vehicles each tire 142 mounted onto its respective wheel 144 is the only part touching the ground, shaft 146 must bear the weight of the vehicle plus any cargo, as well as acceleration and braking forces described above.

The foregoing description conveys the best understanding of the objectives and advantages of the present invention. Different embodiments may be made of the inventive concept of this invention. As an example, in alternate embodiments, coil assemblies 82; 84; 86; and 88 may comprise hydrogen or water within coiling systems to keep coil assemblies 82; 84; 86; and 88 at predetermined cooled temperatures.

In addition, present invention 10 functions as a generator. To function as a generator, the vehicle must be accelerating. Wheel assembly 140 transfers a rotational force on shaft 146, causing central sprocket 182, being fixedly mounted onto shaft 146, to rotate. Central sprocket 182 engages sprockets 184; 188; 192; and 196 that also engage external gear teeth 30 to force rotating ring assembly 20 to rotate upon sprockets 184; 188; 192; and 196. Electro-magnetic assembly 80 comprises stationary coil assemblies 82; 84; 86; and 88. First and second openings of each coil assembly 82; 84; 86; and 88 include winding terminals. The rotation of ring assembly 30 through coil assemblies 82; 84; 86; and 88 converts that mechanical energy to electrical energy, using electromagnetic induction.

Furthermore, in alternate embodiments, instant invention 10 may comprise magnetic forces rather than mechanical gears to accelerate and decelerate the vehicle. It is to be understood that all matter disclosed herein is to be interpreted merely as illustrative, and not in a limiting sense.

What is claimed is:

1. An electro-magnetic motor-generator system, comprising:
    A) a wheel assembly comprising a wheel mounted onto a shaft, said shaft having at least one sleeve mounted thereon;
    B) at least one frame assembly mounted onto said at least one sleeve, said at least one frame assembly comprising at least one hub, said at least one hub comprising a respective first sprocket;
    C) a gear assembly comprising a second sprocket mounted onto said shaft, said second sprocket engaging said first sprocket;
    D) a rotating ring assembly having first and second walls, said first wall comprises first gear teeth and said second wall comprises second gear teeth, said ring assembly further having consecutive magnetized/non-magnetized sections, said first gear teeth engaging said first sprocket; and
    E) electro-magnetic means, said electro-magnetic means consisting of at least one coil arranged stationary, said at least one coil having first and second openings.

2. The electro-magnetic motor-generator system set forth in claim 1, further characterized in that said shaft and said at least one hub are parallel to one another.

3. The electro-magnetic motor-generator system set forth in claim 1, further characterized in that said rotating ring assembly travels through said at least one coil.

4. The electro-magnetic motor-generator system set forth in claim 3, further characterized in that said at least one coil comprises at least two third sprockets that engage said first and second gear teeth as said rotating ring assembly travels through said at least one coil.

5. The electro-magnetic motor-generator system set forth in claim 4, further characterized in that said at least two third sprockets are secured within said at least one coil with an internal frame assembly.

6. The electro-magnetic motor-generator system set forth in claim 1, further characterized in that said first and second openings include winding terminals electrically connected to a distributor.

7. The electro-magnetic motor-generator system set forth in claim 6, further characterized in that said distributor has synchronizing means to send an electrical current to said at least one coil to switch magnetic polarity.

8. The electro-magnetic motor-generator system set forth in claim 7, further characterized in that said electro-magnetic means generate an electromotive force between said first and second openings, and said consecutive magnetized/non-magnetized sections when synchronized by said distributor, wherein switching said magnetic polarity between said first and second openings forces said rotating ring assembly to rotate upon said first sprocket thus exerting a rotational force on said shaft, which is transferred to said wheel assembly to accelerate a vehicle.

9. The electro-magnetic motor-generator system set forth in claim 1, further characterized in that said first sprocket is rotatably mounted onto said at least one hub.

10. An electro-magnetic motor-generator system, comprising:
    A) a rotating wheel assembly comprising a wheel mounted onto a shaft, said shaft having a sleeve mounted thereon;
    B) a frame assembly mounted onto said sleeve, said frame assembly comprising at least one hub, said at least one hub comprising a respective first sprocket, said shaft and said at least one hub are parallel to one another;

C) a gear assembly comprising a second sprocket mounted onto said shaft, said second sprocket engaging said first sprocket;

D) a rotating ring assembly having first and second walls, said first wall comprises first gear teeth and said second wall comprises second gear teeth, said ring assembly further having consecutive magnetized/non-magnetized sections, said first gear teeth engaging said first sprocket; and E) electro-magnetic means, said electro-magnetic means consisting of at least one coil arranged stationary, said at least one coil having first and second openings.

11. The electro-magnetic motor-generator system set forth in claim 10, further characterized in that said rotating ring assembly travels through said at least one coil.

12. The electro-magnetic motor-generator system set forth in claim 10, further characterized in that said at least one coil comprises at least two third sprockets that engage said first and second gear teeth as said rotating ring assembly travels through said at least one coil.

13. The electro-magnetic motor-generator system set forth in claim 12, further characterized in that said at least two third sprockets are secured within said at least one coil with an internal frame assembly.

14. The electro-magnetic motor-generator system set forth in claim 13, further characterized in that said first and second openings include winding terminals electrically connected to a distributor.

15. The electro-magnetic motor-generator system set forth in claim 14, further characterized in that said distributor has synchronizing means to send an electrical current to said at least one coil to switch magnetic polarity.

16. The electro-magnetic motor-generator system set forth in claim 15, further characterized in that said electro-magnetic means generate an electromotive force between said first and second openings, and said consecutive magnetized/non-magnetized sections when synchronized by said distributor, wherein switching said magnetic polarity between said first and second openings forces said rotating ring assembly to rotate upon said first sprocket thus exerting a rotational force on said shaft, which is transferred to said wheel assembly to accelerate a vehicle.

17. The electro-magnetic motor-generator system set forth in claim 10, further characterized in that said first sprocket is rotatably mounted onto said at least one hub.

18. An electro-magnetic motor-generator system, comprising:

A) a rotating wheel assembly comprising a wheel mounted onto a shaft, said shaft having a sleeve mounted thereon at a first predetermined distance from said wheel;

B) a frame assembly mounted onto said sleeve at a second predetermined distance from said wheel, said frame assembly comprising at least one hub, said at least one hub comprising a respective first sprocket rotatably mounted thereon, said shaft and said at least one hub are parallel to one another;

C) a gear assembly comprising a second sprocket mounted onto said shaft at a third predetermined distance from said wheel, said second sprocket engaging said first sprocket;

D) a rotating ring assembly having first and second walls, said first wall comprises first gear teeth and said second wall comprises second gear teeth, said ring assembly further having consecutive magnetized/non-magnetized sections, said first gear teeth engaging said first sprocket, said rotating ring assembly travels through at least one coil; and E) electro-magnetic means, said electro-magnetic means consisting of said at least one coil arranged stationary, said at least one coil having first and second openings.

19. The electro-magnetic motor-generator system set forth in claim 18, further characterized in that said at least one coil comprises at least two third sprockets that engage said first and second gear teeth as said rotating ring assembly travels through said at least one coil, said at least two third sprockets are secured within said at least one coil with an internal frame assembly.

20. The electro-magnetic motor-generator system set forth in claim 19, further characterized in that said first and second openings include winding terminals electrically connected to a distributor, said distributor has synchronizing means to send an electrical current to said at least one coil to switch magnetic polarity, said electro-magnetic means generate an electromotive force between said first and second openings, and said consecutive magnetized/non-magnetized sections when synchronized by said distributor, wherein switching said magnetic polarity between said first and second openings forces said rotating ring assembly to thus exerting a rotational force on said shaft, which is transferred to said wheel assembly to accelerate a vehicle.

* * * * *